W. McLAREN.
APPARATUS FOR MANUFACTURING CUP PASTRY.
APPLICATION FILED DEC. 31, 1919.
1,417,757.
Patented May 30, 1922.
2 SHEETS—SHEET 1.
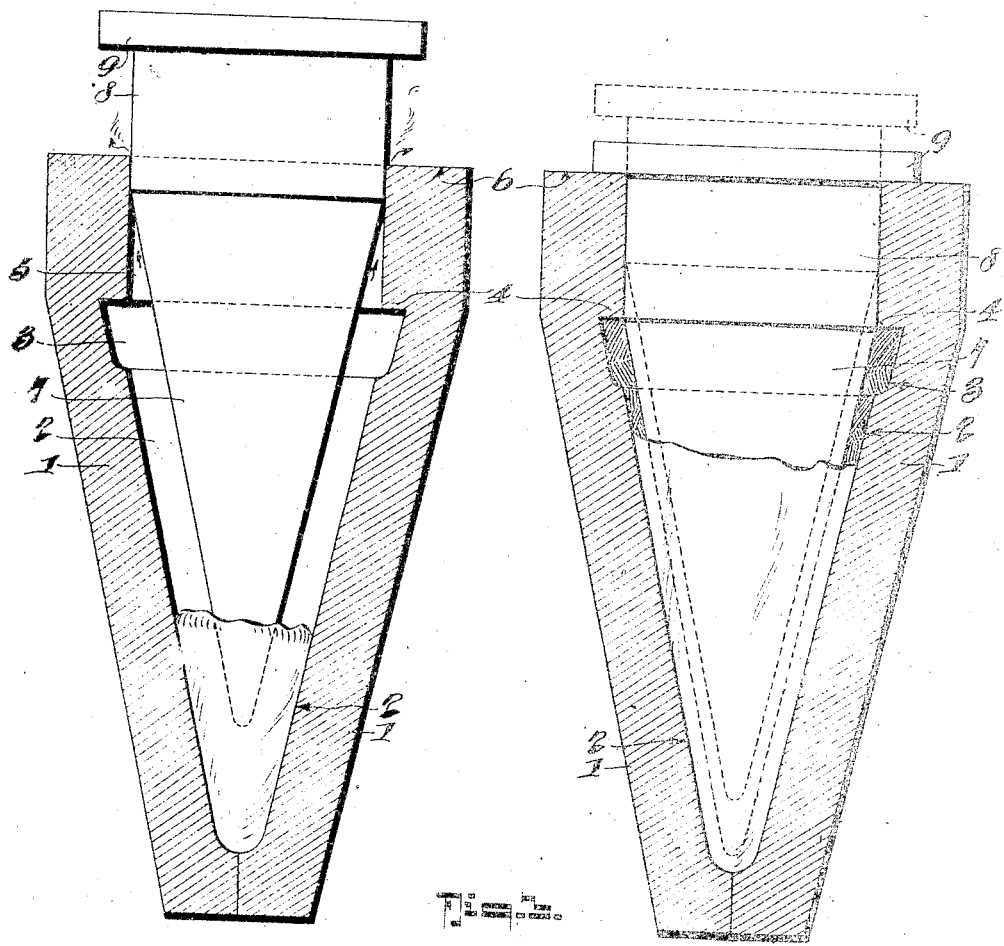
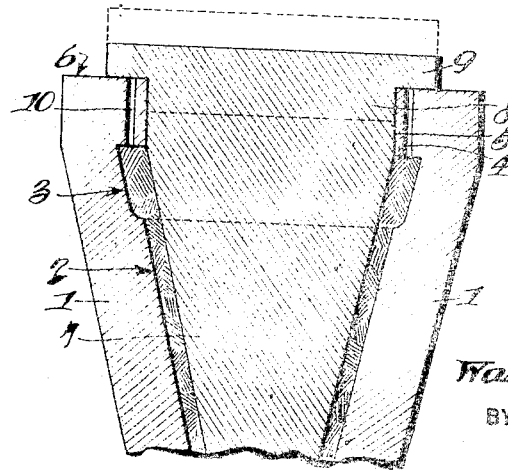
INVENTOR
Walter McLaren.
BY
ATTORNEYS

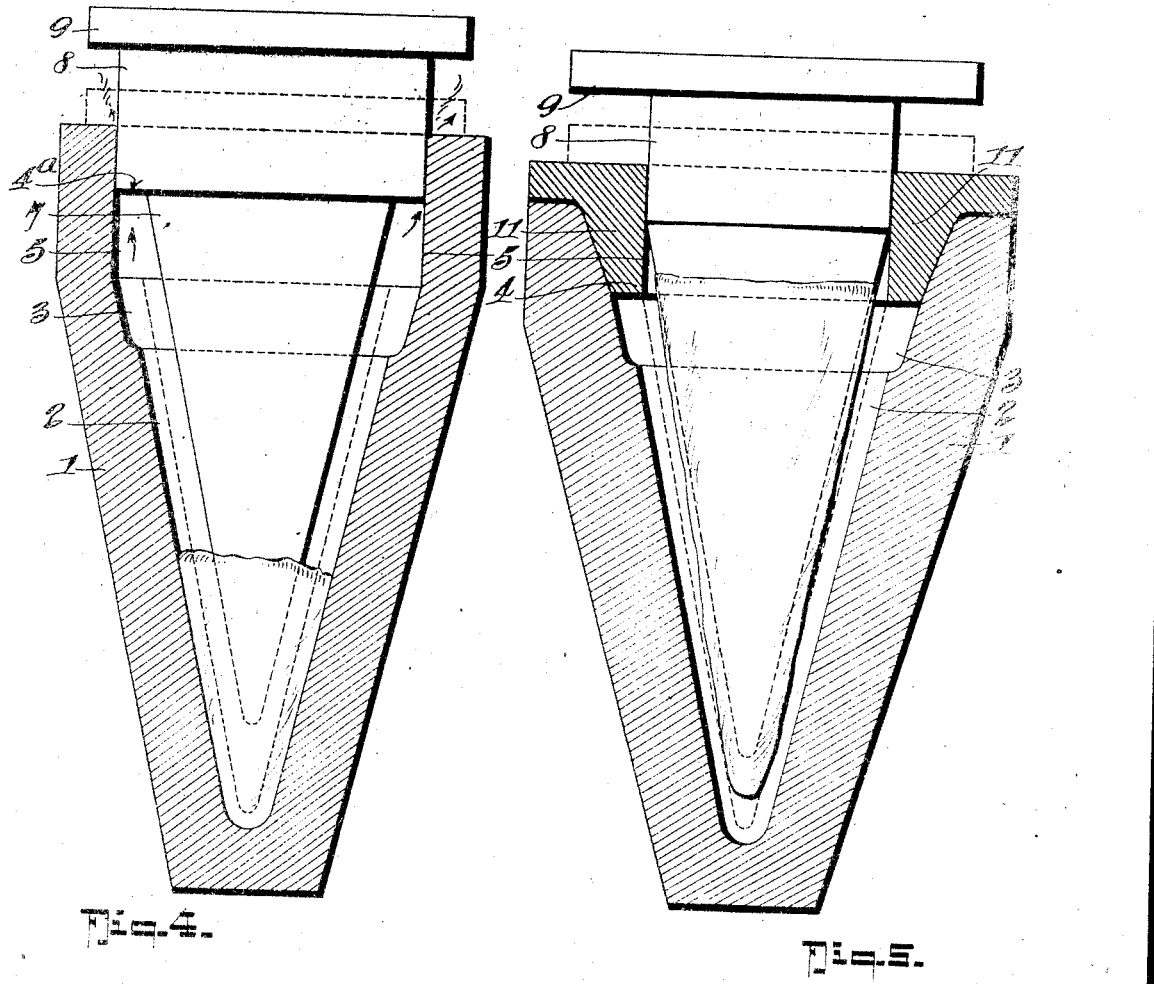

UNITED STATES PATENT OFFICE.

WALTER McLAREN, OF CHICAGO, ILLINOIS, ASSIGNOR TO ALEXANDER McLAREN, OF DAYTON, OHIO.

APPARATUS FOR MANUFACTURING CUP PASTRY.

1,417,757.　　　　　　Specification of Letters Patent.　　Patented May 30, 1922.

Application filed December 31, 1919. Serial No. 348,665.

*To all whom it may concern:*

Be it known that I, WALTER McLAREN, a citizen of the United States, residing at Chicago, in the county of Cook and State of Illinois, have invented a new and Improved Apparatus for Manufacturing Cup Pastry, of which the following is a specification.

My invention relates to the art of cup pastry manufacture in which it is the practice to mold and bake the articles in male and female element baking molds, either by use of hand operated devices, or by the use of automatic machines.

In the art as heretofore practiced, the construction and manipulation of the molds has been such that an excess of batter above the amount required to form a perfect cone, must usually be present in order that all cavities of the mold unit may make full cones. This practice has resulted in great waste of material, ranging from 20 to 40 per cent depending upon the apparatus employed and the skill of the operator.

It is therefore one of the objects of my present invention to provide an apparatus of such construction that by the use of which this waste may be practically eliminated and perfect cones made without their being required to be trimmed, thereby obtaining a greater number of perfect cones from a given quantity of flour than has heretofore been possible when employing the methods and apparatus in vogue prior to my invention.

A further object of my invention is to provide means whereby the batter may be worked down and finally compressed within a compartment of uniform volume (regardless of the usual variations in the quantity of batter delivered to the mold cavity) thus enabling the production of a product of exact dimensions or size with smooth edges and of any desired shape or design.

In carrying out my invention, I preferably employ molds of the usual male and female types (either solid bed, for making paste cones, or split molds, for making sugar cones) preferably providing the mold with a throat and providing the core with a neck, the latter being designed to fit the throat at the mouth of the female part, before the core is forced home, thus closing the cavity, upon the partial insertion of the core, against the escape of the batter and yet allowing for the more or less free escape of steam, and enabling the core to be reciprocated (raised and lowered) to work the batter to fill the entire mold cavity and on the final seating of the core compress the batter to its final form and size.

Another object of the present invention is to provide a mold of such construction that adequate provision is made for the accurate centering of the core, thus enabling a cone to be produced whose wall will be of uniform thickness all around.

The invention also resides in those novel features of construction, combination and arrangement of parts, all of which will be first fully described, then specifically pointed out in the appended claims and illustrated in the accompanying drawings, in which:—

Figure 1 is a vertical section of a baking mold unit of the type employing a split female mold element, the batter charge having been introduced and the core partly inserted, the mouth of the mold being closed against the escape of batter.

Figure 2 is a view similar to Figure 1, showing the intermediate position of the core in dotted lines and the final position in full lines.

Figure 3 is a detail view similar to Figures 1 and 2, of a modification and showing the core in its final position after the steam has escaped and the batter has been compressed to the size and shape desired.

Figure 4 is a vertical section of a solid bed mold in which the neck of the core is enlarged and the throat of the mold is correspondingly enlarged so as to permit the ready removal of the cone from the mold cavity, the core being shown in the intermediate position in full lines and in the final position in dotted lines.

Figure 5 is a vertical section of a modified structure of solid bed mold in which the female mold is made with a cap which is bored to form the throat for the neck of the core, the neck of the core in this form being not enlarged beyond the greatest diameter of the core.

In the drawings, in which like numerals and letters of reference indicate like parts in all of the figures, 1 represents the female mold, which, in practice, may either be of the solid bed type or of the split mold type, the solid bed type being illustrated in Figures 4 and 5 of the drawings, and the split mold type being illustrated in the first three figures of the drawings. Molds of the split type are usually provided with a plurality of cavities adapted to be opened by a separation of the molds along the central plane. In the drawing, but a single cavity is shown for purposes of illustration. The molding cavity usually comprises a coniform portion 2 which forms the body of the cone and a recessed portion 3 which forms the head of the cone.

In my improved construction of mold the molding cavity is located a suitable distance below the top face 6 of the mold and a throat 5 is formed in the mold which communicates with the molding cavity and forms a shoulder 4 where the throat 5 meets the upper end of the molding cavity. 7 designates a core which is provided with a neck 8 designed to enter the throat 5 and fit the same with a working fit, i. e., such a fit as will permit the escape of steam while not permitting the escape of batter between the surfaces. The core 7 is carried by a head 9 which overlies the neck 8 and is adapted, when the core is fully seated, to rest in engagement with the top face 6 of the mold (see Figure 3) thereby determining the final position of the core in the mold. In addition to allowing the steam to escape between the surfaces of the throat 5 and neck 8, the mold may be provided with suitably located vents 10, preferably of such cross-sectional area, however, as not to permit the escape of the batter so as always to maintain a pressure within the molding cavity.

In the modified form shown in Figure 4, the throat of the mold cavity is of the same diameter as the greatest diameter of the molding cavity and the core neck is enlarged to correspond therewith. This will allow the cone to be withdrawn from the mold cavity after it has been formed.

In the form shown in Figure 5, over-hanging portion 4 of the mold is produced by the insert plug 11 which forms a part of the female mold and is removable for the purpose of allowing the withdrawal of the cone when it has been completed, the plug 11 being bored to form the throat 5, as shown.

In Figure 4, the over-hanging part, which forms the top edge surface of the cone, is provided at 4ᵃ by the enlarged neck of the core.

In the practical application of the invention, the batter may be placed in the mold cavity in the usual way. After the batter has been placed in the cavity, the core is introduced into the same and causes the batter to be spread upwardly in the mold cavity (see Figure 2). As the neck 8 fits the throat 5 with a working fit, the steam will escape between the engaging surfaces of these parts but the batter cannot escape and hence is confined within the cavity of the mold. The core is then further projected into the cavity, either by a continual downward gradual movement or by a succession of reciprocating or teetering movements gradually approaching the final seating of the core. This results in the alternate increasing and decreasing of the pressure within the mold cavity to work the batter into all of the recesses of the cavity. The operation of reciprocating the core as it is being seated is conducted such number of times as may be found desirable in practice until the escape of steam has practically subsided, at which time the batter will then fill the molding cavity and become practically evenly distributed at the mouth of the same, the shoulder 4 acting as a baffle for the rising batter and assisting in its distribution. The final movement of the core to bring it to its fully seated position (see Figure 3) results in a final compression of the mass, and the elimination of blow-holes. If the batter in swelling, fills up one side of the molding cavity more than at another place and works into the throat it will be forced down out of the throat into the molding cavity on the final movement of the core.

While the above described manner of manipulating the core is the preferable one, it is obvious that other manipulations of the parts may be effected to obtain the desired result, as, for instance, instead of reciprocating the core it may be forced to its final seated position by a preferably continuous gradual pressure, either applied mechanically, or through the weight of the core bar and core, which may be made heavy enough to perform this function.

Should the amount of batter fed into the mold cavity be less than the exact amount required, the batter will be swelled up by the steam action and the reciprocating movements of the core until it fills the cavity. If a slight excess of batter is employed, the batter will be compressed within the mold cavity. In the first place, a slightly lighter cone is produced than in the latter case, but in both instances the final size and shape of the cone will be the same.

It will be noticed that one of the essential features of my present type of mold resides in providing a mold in which the material worked upon is confined, as it were, in a closed chamber, the area of which is then decreased and pressure applied to compact the mass of the article into a definitely defined size and shape.

When the core is seated with a uni-directional continuous motion, the vents 10 may be employed to allow a somewhat more rapid escape of steam during the initial part of the operation before the batter reaches the shoulder 4 and thus close the vents 10, thereby enabling the core to be seated somewhat more rapidly than would otherwise be the case.

The drawings illustrate preferred embodiments of my invention but I do not wish to be understood as being limited to the specific embodiment shown and described as changes in the details of construction may be made to suit the particular machine or apparatus in which the invention is to be embodied.

In this application, I make no claim to the method of operation or method of making the cones by the use of the apparatus herein described, as that forms the subject matter of my application filed October 6, 1919, Serial No. 328,655, of which application the present application is a continuation in part.

From the foregoing description it is thought the complete operation, advantages and uses of my invention will be readily understood by those skilled in the art.

What I claim is:

1. In apparatus of the character stated, a female baking mold having a blind molding cavity and a restricted throat between the molding cavity and the mouth of the mold, a core adapted to enter and partly fill the molding cavity and including a neck to fit into said throat to close the mold against the escape of batter while permitting the escape of steam.

2. In apparatus of the character stated, a female baking mold having a blind molding cavity and having a throat between the molding cavity and the mouth of the mold, the diameter of the throat not exceeding the greatest diameter of the molding cavity, a core adapted to enter and partly fill the molding cavity and including a plug adapted to fit into said throat to close the mold against escape of batter while permitting the escape of steam and a head for the core overlying the neck and adapted to rest on the top of the mold when the core is fully inserted to thereby position the core within the mold.

3. In apparatus of the character stated, a female baking mold having a blind molding cavity and having a restricted throat between the molding cavity and the mouth of the mold, a core having a neck of a diameter equal to the greatest diameter of the core and adapted to enter said throat upon the partial introduction of the core into the mold cavity to close the mold cavity against the escape of batter.

4. In apparatus of the character stated, a female baking mold having a blind cavity and having a throat between the molding cavity and the mouth of the mold, a core having a neck of a diameter equal to the greatest diameter of the core and adapted to enter said throat upon the partial introduction of the core into the mold cavity to close the mold cavity against the escape of batter, the aforesaid structure having provision for the free escape of steam while the core is partly inserted into the mold and for restricting the free escape of steam when the core is fully inserted into the mold.

5. In apparatus of the character stated, a female baking mold having a blind molding cavity and a throat between the molding cavity and the mouth of the mold, said molding cavity including a recessed portion adjacent to the throat to provide a shoulder against which the swelling batter may engage and be deflected, a core adapted to enter and partly fill the molding cavity, said core having a neck to enter and plug said throat upon the partial introduction of the core into the molding cavity and to thereby cut off the escape of batter while permitting the escape of steam.

6. In apparatus of the character stated, a female baking mold having a blind molding cavity and a throat between the molding cavity and the mouth of the mold, said molding cavity including a recessed portion adjacent to the throat to provide a shoulder against which the swelling batter may engage and be deflected, a core adapted to enter and partly fill the molding cavity, said core having a neck to enter and plug said throat upon the partial introduction of the core into the molding cavity and to thereby cut off the escape of batter while permitting the escape of steam, and means for capping the steam escapeway upon the full insertion of the core into the mold to retard the escape of steam.

7. In an apparatus of the character described, a female baking mold having a cavity provided with a throat adjacent to its mouth and a molding or die section beyond the throat, a core element including a core member, and a neck adapted to enter the throat and close the mold cavity to prevent the escape of batter before the core is fully seated, and means for freely relieving pressure within the mold cavity during the initial part only of the insertion of the core.

8. In apparatus of the character stated, a female baking mold having a cavity provided with a die or molding portion and a counterbore adjacent to the mouth of the cavity, steam-escape ports adjacent to said counterbore, a core adapted to enter and partly fill said mold cavity and cooperate with the die portion thereof to give form to the article, and means cooperative with the core for closing said steam-escape ports.

WALTER McLAREN.